United States Patent
Shafigullin et al.

(10) Patent No.: US 9,661,014 B2
(45) Date of Patent: May 23, 2017

(54) LEVERAGING PERSISTENT IDENTITIES IN WEBSITE TESTING

(71) Applicant: LinkedIn Corporation, Mountain View, CA (US)

(72) Inventors: Roman Shafigullin, Sunnyvale, CA (US); Yuji Kosuga, Sunnyvale, CA (US); Arvind Mani, Los Altos, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 46 days.

(21) Appl. No.: 14/841,600

(22) Filed: Aug. 31, 2015

(65) Prior Publication Data

US 2017/0063915 A1  Mar. 2, 2017

(51) Int. Cl.
*G06F 21/00* (2013.01)
*H04L 29/06* (2006.01)
*G06F 11/36* (2006.01)

(52) U.S. Cl.
CPC ...... *H04L 63/1433* (2013.01); *G06F 11/3688* (2013.01); *G06F 11/3692* (2013.01)

(58) Field of Classification Search
CPC ......... H04L 67/02; H04L 47/22; H04L 67/10; H04L 43/50
See application file for complete search history.

(56) References Cited

U.S. PATENT DOCUMENTS

2009/0287791 A1* 11/2009 Mackey .............. G06F 11/3414
  709/209
2010/0293616 A1* 11/2010 Young .................. G06F 21/564
  726/25

* cited by examiner

*Primary Examiner* — Ghazal Shehni
(74) *Attorney, Agent, or Firm* — Dominic Tsang; Hickman Palermo Becker Bingham LLP (57) ABSTRACT

A system and method for dynamically scanning one or more features on a Website. The system allows detecting of stored scripting errors, where an attack or injection occurs on a page or feature that results in executing malicious code by another page or feature. The system uses stored test identities and allows testing reuse.

20 Claims, 4 Drawing Sheets

LEVERAGING PERSISTENT IDENTITIES IN WEBSITE TESTING

TECHNICAL FIELD

The present disclosure relates to testing the security of Websites and, more particularly, to detecting scripting errors on Websites.

BACKGROUND

Users today rely on the Internet for a variety of things. Users can find information on more mundane matters, such as checking for a recipe on how to make a particular dish or on more serious matters such as finding a new job, maintaining professional contacts, or finding people with the right qualifications to hire. This has led to very sophisticated Websites that include many features (or applications), often from different developers or different teams. These developers can be in-house (e.g., developers who work directly for the Website operator) or third-party developers (e.g., developers who create material for use with the Website but are not employed directly by the Website operator).

Especially for these feature rich Websites, securing them has become a particularly difficult task. Different features can be created by different developers, but they all need to work well together on each respective Website. An example of an error that can occur include encoding errors. For example, each feature on the Website may need to communicate with other features or data resources to exchange, update, create, or delete information. To do this, the features need to select the proper filters to make sure that the information is properly encoded.

One of the difficulties in catching encoding errors is when the error is in a special category of errors, known as a stored XSS error. This means that, although the error (e.g., XSS error) appears on one page or feature of the Website, the attack/injection itself was introduced onto the Website from another page or feature. Since detecting these errors involve more than one feature, they are difficult to detect. Therefore, there is a need to prevent or detect encoding errors, such as when they include stored XSS errors.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques and a system are provided for testing the security of a Website and for providing insight on where an error occurs. Different teams responsible for different features of the Website may go through different testing, test with different vigorousness, or apply improper fixes when errors are identified during testing. As an example, a first developing team for a first feature on a Website may be more conscientious about checking for encoding errors in their feature than a second developing team for a second feature. However, since both features need to work properly on the Website, errors from the second feature can affect the usability and security of the first feature and the entire Website.

The system may be used to detect various encoding errors on a Website. For example, an encoding error can occur for a feature when an input to the feature may need information to be encoded in a HyperText Markup Language (HTML) format, but the information is supplied in a JavaScript format. To properly understand the information, the feature needs to change the encoding of the information. Failure to do so can result in security, duplication, or other errors. The system includes methods and techniques to detect and, optionally, provide suggestions on how to fix these errors.

One of these errors is cross-site scripting (XSS). An XSS vulnerability enables attackers to inject script into a Website. When users view the Website, they will retrieve the injected script from the Website onto their own computer (or client-side). Usually, a user's computer would not execute this script from a random source on the Internet. But, taking advantage of a computing paradigm known as the same-origin policy, the computer will allow the script to execute. In the same-origin policy, code and access to information allowed to a first origin (or Website) is allowed to all Web pages from the first origin. When the first origin is a trusted origin, this potentially allows an XSS vulnerability to occur. This XSS vulnerability can result in an error on a Webpage or feature where the script is injected, or on another Webpage or feature.

To exploit a XSS vulnerability, a Website that is a trusted origin has a script from a potentially malicious source injected. Some popular locations where injection occurs is at fields, cookies, or headers of the Website. Since this Website is a trusted origin, a user viewing Web pages from this website will grant it a higher level of permissions than they would for untrusted sources. This allows the script from the potentially malicious source to load onto the user's computer. The user may not trust the source of the injected code, however since it was delivered by the trusted origin, the script executes and operates under the same permission granted to the trusted origin. Some examples of information an attacker can gain using XSS vulnerabilities include gaining elevated access-privileges to sensitive page content, session cookies, and a variety of other information maintained by the browser on behalf of the user.

In an embodiment, the system detects reflected XSS errors. As discussed in greater detail elsewhere in this application, scripting errors usually involve two types: reflected and stored errors. The system is designed to detect stored errors (a scripting error that occurs on a page or feature other than the one where the attack or injection occurs). This may mean that there were actually two errors:

(1) At point of injection, an error due to lack of input validation. This error allows injecting malicious code; and (2) At render or display time, an error due to improper encoding.

This is different than reflected errors, which are errors that appear on the same page or feature that included the vulnerability. The system uses stored test identities and allows automated testing with existing tests already created and customized by each respective feature team, which reduces efforts in creating customized and effective testing.

In an alternate embodiment, the system detects reflected as well as stored XSS errors. As discussed in greater detail elsewhere, the detection features of the system are robust in detecting many different types of scripting errors, including reflected and stored errors.

In one technique, the system includes using two or more test identities to identify encoding errors. These test identities are used for testing purposes and do not represent real-person users (or members) of the system. For example, since these test identities do not correspond to users, the information associated with the test identities can not be reached (or accessed) by users or members of the system. This may mean that the system prevents users from accessing the information, executing the test identities in a separate environment that is not accessible to users, removing test identities from information accessed by users, or by other methods. This prevents possibly injected code from reaching users of the system. The system may include a special flag that indicates the test identities are not real users of the system.

The system may test two or more features at a given time. On a feature rich Website, many features may be included with the Website. Using the LinkedIn® Website as an example, some examples of features include a profile feature, profile editor feature, search feature, news feed feature, messaging feature, hiring manager feature, linked articles feature, updates to users you know feature, search alerts feature, introductions feature, people you may know feature, job search feature, and many other features. The Website may include one or more of these features on a given Web page. Even if a feature is not explicitly included on a Web page (e.g., it does not contribute to a visual element shown on a particular Web page), other features of the Web page may access information stored by the feature. LinkedIn is a trademark of the LinkedIn Corporation.

The system includes the features in a compiled format. This means that the features are supplied to the system not in a source code format or, if the system is supplied source code, the system renders the source code to a compiled format. The features do not need to be fully executable (e.g., ready for stand-alone execution on a browser or computer). The system can supply inputs and other support to allow tested features to execute properly in a testing environment, as needed.

The system may include a testing database including a first set of tests associated with the first feature and a second set of tests associated with the second feature. This allows the system to reuse tests developed by different teams, usually the same team that developed the feature. Usually, tests are developed internally by developers of the feature, but these tests are lost on each successive build of the feature. The system retains memory of these tests, so that efforts to create testing do not need to be duplicated. A set of tests can include one or more different tests that analyze different aspects of its respective feature. This provides various benefits to the system. As one example, this allows customized testing for the features of the system. Usually, tests are developed internally by each developer, but these tests are lost on each successive build of the feature. The system retains memory of these tests, so that efforts to create testing do not need to be duplicated. As another example, this allows customizing testing to be developed for each feature. If existing testing can not be used, then testing can include only generalized testing, since special testers will be needed that may not understand how the feature has been developed and miss flaws developers were previously aware of. This allows the system benefits including:

(1) Re-use of functional tests for security testing, avoiding the overhead and maintenance associated with writing tests specifically for security. This is because for large Websites, it is difficult for administrators to keep track of tests for each feature.

(2) Some types of testing such as functional testing creates distinct new accounts for each feature test (e.g., each feature has newly created users) and every run (e.g., each time tests are executed has new users). The system, by re-using test accounts, allows test data to persist across different runs of testing and across different features. This allows the system, for a test for feature 1 and a test for feature 2, to detect injection in feature 1 that shows up on feature 2. The system also re-uses test data across multiple runs of the test suite. This allows catching errors introduced in a feature 3 when the feature 3 is released at a later time (even though injection happened in the past, before feature 3 was introduced into the system). Also, since the system allows injection on more than one test identity, the system may detect an XSS injection on test identity 1 when injection was carried out by test identity 2.

In an embodiment, tests used by the system include a test script. The test script includes a series of steps that the system executes with associated test data. This process may be automated (by using test automation software included with the system, separate from a Website being tested). Although test scripts are saved on each successive build of the feature or successive run of the test script, the system provides a method to store the test scripts, associated with a feature the test script is used with. In an alternate embodiment, a test (or test suite) includes a set of test scripts. A "run" of the test scripts means to execute the test scripts in the test suite. Various feature (or product) teams create test scripts that are run as part of the test suite execution.

The system may modify one or more attributes associated with the first test identity to create a first modified attribute. For example, the first feature includes an input that is associated with the first test identity, such as a name for the first test identity. The system modifies the name for the first test identity, into something that will be detected by the system later on. This modified attribute may be malicious script or, in alternative embodiments, an innocuous string (e.g., "inserted error"). The innocuous string may be something easy to spot by the system, such as a predefined string used by the system to determine whether an error has occurred. The test identities may include a high level of permissions to first and second features, so that the test identities are allowed to the highest level of access to information from the first and second features as possible.

The system allows the first set of tests, associated with the first feature, to execute. In an embodiment, the first set of tests includes tests detecting whether an encoding error has occurred. In an alternative embodiment, the system may provide testing for additional types of errors, such as syntax, style, or other testing. The results of this testing may result in no errors or, if an error has occurred, be a result of a second modified attribute, different than the first modified attribute. This may occur when the second modified attribute was injected before the first modified attribute, since the system uses persistent test identities (e.g., the system does not recreate new test identities across different features or different iterations of testing). If this occurs, this means that there was potentially an XSS error where the second modified attribute occurred, but does not conclusively indicate whether there is an error with the modified first attribute. If no error has occurred, the system allows the second set of tests, associated with the second feature, to execute. The results of this testing are a fail condition, based on the modified first attribute.

The system may use a variety of methods to determine whether tests have completed successfully. One method may include scanning a feature to determine whether injected code is present. The injected code was previously determined and detectable by searching for the injected code.

In an embodiment, the system includes allowing the system to identify the first modified attribute as a cause of the failure condition. The system may indicate that the fail condition includes a successful cross-site scripting (XSS) attack.

In an embodiment, the system may modify more than one attribute associated with the first or second test identities before executing testing for the first or second features. In this case, although there may be more than one encoding error, not all encoding errors need to be detected by running the first or second set of tests. Some errors may occur on a third feature, which is not currently being tested. The system may include executing the second set of tests in response to modification of the first attribute.

In an embodiment, before modifying the first attribute, the system modifies a second attribute associated with the first test identity or the second test identity to create a modified second attribute, where executing the first and second sets of tests associated with the first and second features, respectively, includes executing the first and second sets of tests based on the first and second modified attributes.

The system may scan the first or second features for first and second vectors, where the first and second vectors include a location in the Website where information is received. The system may include determining to modify attributes at a first input but not at a second input.

Example System Implementation

Figure 1:
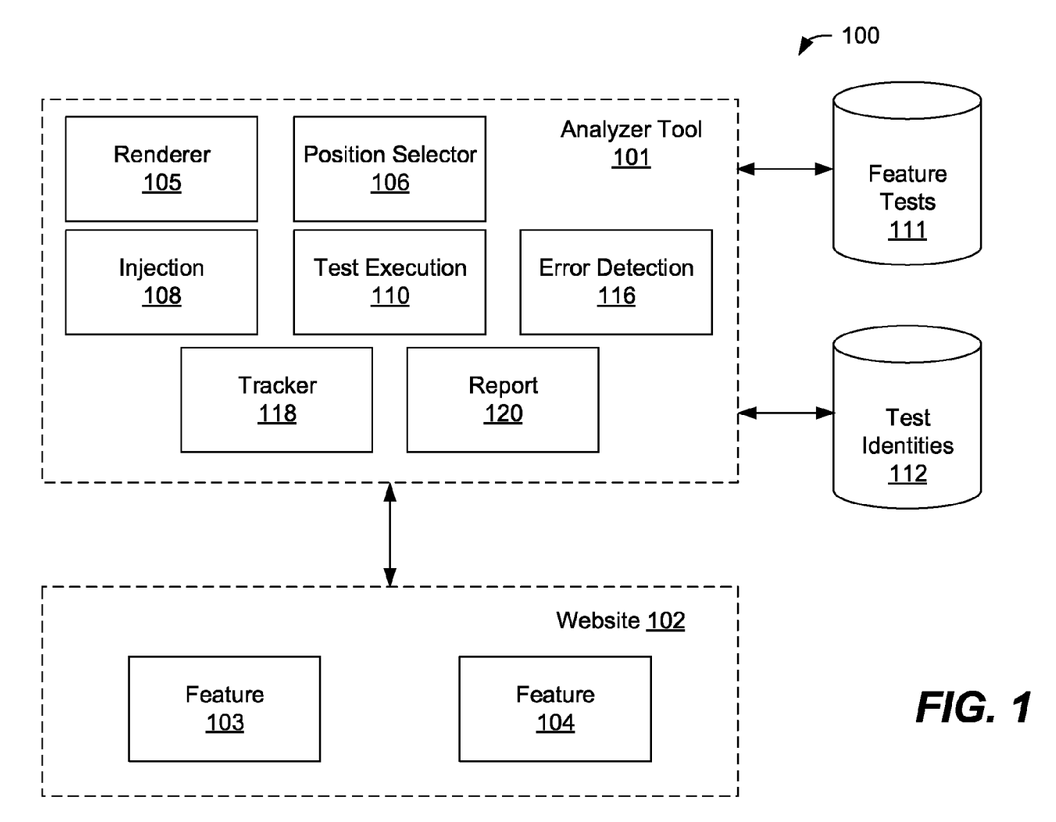
FIG. 1 illustrates an example system in which the techniques described may be practiced according to certain embodiments.

FIG. 1 illustrates an example computer-based system 100 in which the techniques described may be practiced according to certain embodiments. The various components of system 100 are implemented at least partially by hardware in one or more computing devices, such as one or more hardware processors executing instructions stored in one or more memories for performing various functions described herein. For example, descriptions of various components (or modules) as described in this application may be interpreted by one of skill in the art as providing pseudocode, an informal high-level description of one or more computer structures. The descriptions of the components may be converted into software code, including code executable by an electronic processor. System 100 illustrates only one of many possible arrangements of components configured to perform the functionality described herein. Other arrangements may include fewer or different components, and the division of work between the components may vary depending on the arrangement.

System 100 includes an analyzer tool 101. The analyzer tool 101 includes various modules to perform dynamic source code analysis. The analyzer tool 101 is allowed access to a Website 102 that includes features 103 and 104. These are different features (or applications) on the Website where there is at least one input from feature 103 to feature 104. The Website 102 may include any number of additional features, not shown here.

The features may be written in a weakly typed or hybrid typed language. Some examples of weakly typed languages include Dust, Rust, ember.js, Groovy Server Pages (GSP), or Java Server Pages® (JSP). Weakly or hybrid typed languages will often perform limited type conversions. For example, if no filter is specified by the source code, then a compiler executing the source code may default to a filter (e.g., HTML, JavaScript®, or other). This can result in an improper conversion occurring, since the position will include a filter that does not belong, causing improperly encoded information. This can produce unpredictable results as discussed in greater detail elsewhere in this application.

In another embodiment, source code from one or more of strongly typed, weakly typed, or hybrid languages are included. Some examples of strongly typed languages include Java®, Pascal, Ada, and C. As opposed to a weakly or hybrid typed language, a strongly typed language is likely to generate an error or refuse to compile source code if the argument passed to a function does not closely match the expected type. This may make encoding vulnerabilities more difficult to exploit in these languages. Java, Java Server Pages, and JavaScript are registered trademarks of Oracle Corporation.

A renderer module 105 is responsible for producing testable versions of the features. The system does not need to generate an entire Web page to perform testing (e.g., every dependency of the Web page is defined) and can supply variables and other input as needed to properly test features. A position selector module 106 reviews the testable (or compiled) versions of features to determine areas of interest in a feature. Some areas of interest include parameters, variables, arguments, tag identifiers, or other input information. This input can be in a variety of various data types, such as integers, Booleans, characters, floating-point numbers, alphanumeric strings, array, complex data types, or other data types.

Once the system has determined positions or areas of interest, an injection module 108 determines whether to supply test information at that particular position or area. The system can use a variety of methods to determine whether to supply test information at a position, including randomized injection, injection at previously defined areas of high risk, injection at common points of error, or other methods. Some examples of positions of interest include information at a headline, name, hidden fields, checkboxes, selectors, or latest updates. Supplied test information may result in one or more changes in test identities of the system.

A test execution module 110 performs testing on whether test information included by the injection module 108 has resulted in an error. The test execution module 110 accesses feature tests database 111 and test identities database 112. The feature tests database 111 includes one or more tests supplied and maintained by each respective feature developer. Alternative embodiments include testing developed by other teams (e.g., quality assurance team). The test identities database 112 stores test identities maintained by the system.

Changes made by injection module 108 may be stored in the test identities database, associated with each respective test identity. A user database is maintained by the Website, however it is stored separately from the test identities database 112.

An error detection module 116 includes detecting whether an error has occurred after the test execution module 110 has performed testing. The error detection module 116 may scan an example Web page that include features of the system, to determine whether injected code has produced an error.

A tracker module 118 allows the system to determine what produced the error, if error detection module 116 has determined an error has occurred. This will generally include an indication as to where and which injection by the injection module 108 has resulted in the error. An example of an injection includes a sample script that may or may not be malicious, but may be used by the system to identify that an error has occurred. For example, if a feature being tested includes a first and second positions that the system may choose to inject, and the first, second, or both positions are injected, the system will return at least one of those positions as being the cause of an error.

A reporting module 120 may present reports on errors detected by the error detection module 116. The reporting module may also include information from the tracker module 118 to identify error specifics and assist in fixing the error.

Databases 111 and 112 may be any suitable storage device such as one or more hard disk drives, memories, or any other electronic digital data recording device configured to store data. Although the databases are each depicted as a single device in FIG. 1, each database may span multiple devices located in one or more physical locations. For example, feature tests database 111 may be one or nodes located at one or more data warehouses. Additionally, in one embodiment, feature tests database 111 and test identities database 112 may be located on the same device(s) executing the analyzer tool 101. Alternatively, the databases 111 and 112 may be located on a separate device(s) executing the analyzer tool 101.

Process Overview

Some specific flows for implementing a technique of an embodiment are presented below, but it should be understood that embodiments are not limited to the specific flows, processes, and steps presented. A flow of another embodiment may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular application or based on the data.

Figure 2:
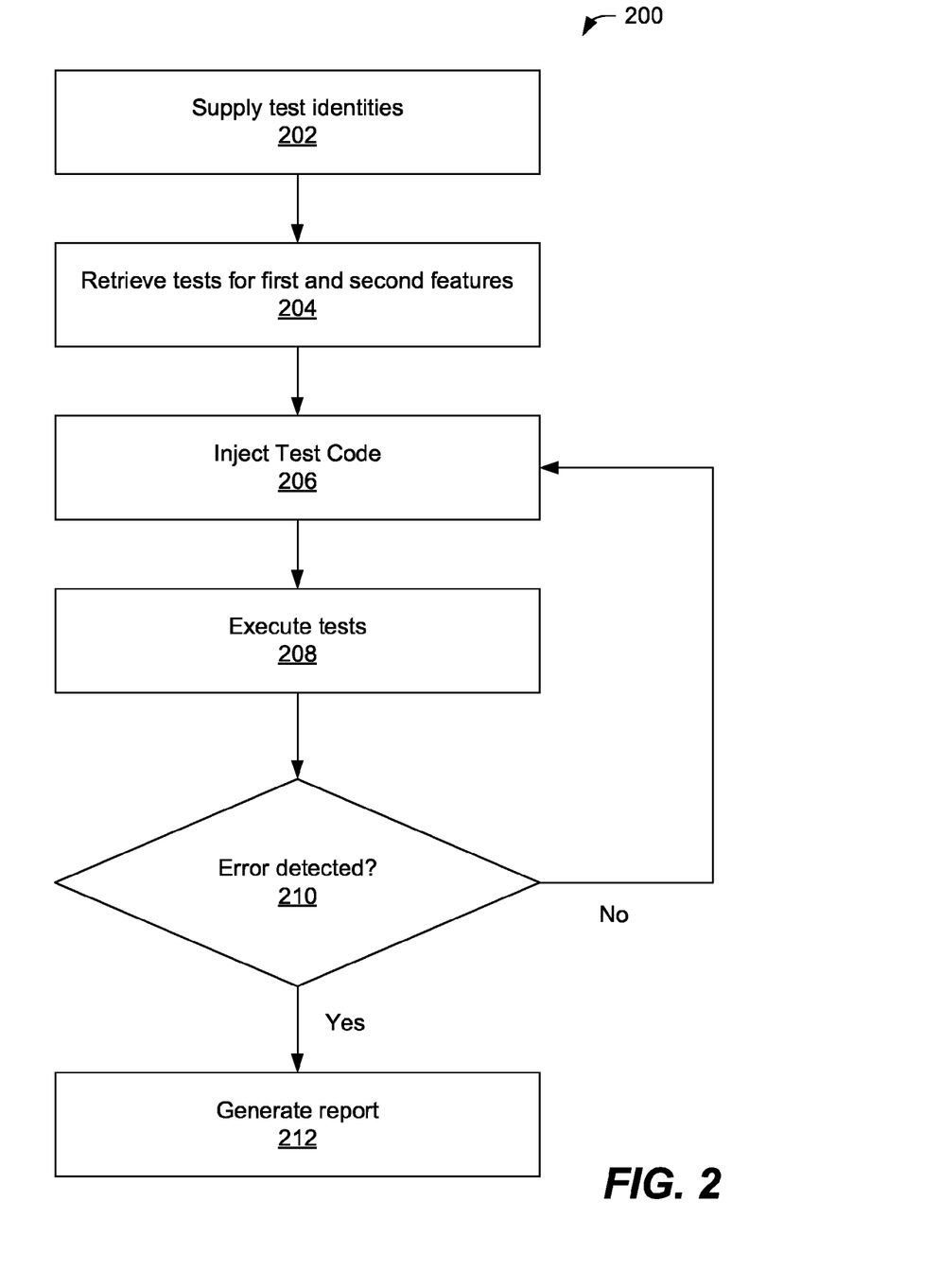
FIG. 2 is a flowchart that depicts an example process for detecting encoding errors using dynamic code analysis, in an embodiment.

FIG. 2 is a flowchart that depicts an example process 200 for detecting encoding errors using dynamic code analysis, in an embodiment. In a step 202, the system supplies test identities. The test identities can be directly coupled to each other in a social graph of the system. This may mean that these two test identities "know" each other or are somehow associated with each other by one or more methods in the system.

In a step 204, the system retrieves testing for first and second features. The testing can be reusable and updated as needed. For example, a set of tests for a first feature may be reused to test the first feature one or more times. The testing may include one or more different tests for each feature.

In a step 206, the system injects code into the first feature. This means that, at a first location of the first feature where information is input, the system injects code. Such code may be any type of code that the system can identify later to determine whether a malicious injection were possible at the first location. However, the injected code itself may or may not be malicious, depending on different methods the system is using to detect injections. Some examples of locations of interest includes header fields, name fields, display elements the user may interact with (e.g., check boxes, drop-down menus, or other elements), search field, or many other fields. The injected code may be associated with a first test identity of the system.

In a step 208, the system executes tests. These may be the tests retrieved in step 204. The tests may include navigating to one or more different Web pages, after an injection has occurred. In an embodiment, the system is aware of the background of its tests when the tests are executing. For example, the system may know that the test is executing on a first feature that is part of a first function of a Website. The system may also know that the Web page is viewed as (or from the perspective of, or "logged" into as) a second test identity while performing the tests and that the Web page is accessing information supplied while logged in as a first test identity.

In a step 210, the system determines whether an error has been detected by the tests. If no error has been detected, then the process 200 returns to step 206. If an error has been detected, then, in a step 212, the system generates a report. The report can be automatically posted onto a testing Website, e-mailed to a system administrator, transmitted to a development team, or other. Each report may include one or more errors.

Process 200 of the system can include more, fewer, or changed steps. For example, instead of proceeding to step 212, once an error is detected, the system can complete scanning of all the tests or injecting at more than one position of a feature before generating a report. In another embodiment, process 200 involves reordered steps. For example, supplying test identities may occur after retrieving tests.

Figure 3:
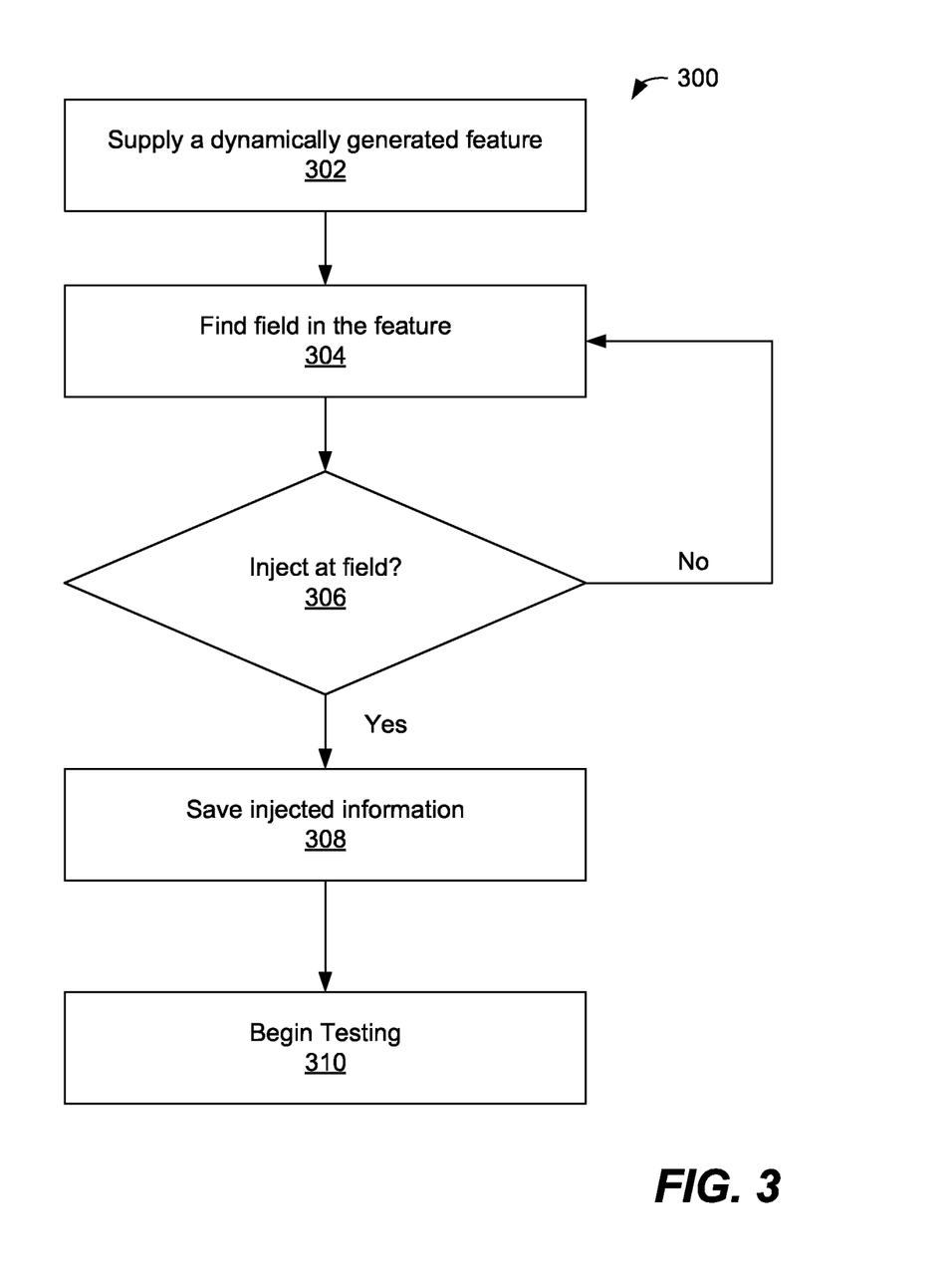
FIG. 3 is a flowchart that depicts an example process for determining whether to inject at a position, in an embodiment.

FIG. 3 is a flowchart that depicts an example process 300 for determining whether to inject at a position, in an embodiment. Alternatively, this process may sometimes be referred to as "spidering." For example, this may be used with step 206 of FIG. 2. In a step 302, the system supplies a dynamically generated feature. The dynamically generated feature does not need to be executable as a stand-alone process, but has included one or more positions where input may be entered.

In a step 304, the system finds a field (or position) in the feature. In a step 306, the system determines whether to inject at the field. This may be done randomly, based on a profile of where errors have previously occurred, or any other method as described in this application. If the system determines to not inject at a field, then the system returns to step 304.

If the system determines to inject at a field, then, in a step 308, the system saves the injected information. The system may save the injected information as part of an attribute of a test identity used by the system. In a step 310, the system begins testing. Process 300 of the system can include more, fewer, or changed steps. For example, the system may find all fields in a feature, before injecting.

Social Network

In an embodiment, the system is used with a social network. The social network allows users, persons, organizations, companies, and other entities to connect (or couple) together in the social graph. Nodes of the social graph represent entities and edges of the social graph represent connections in the social graph between the different entities. Some examples of these connections that may be tracked by the system include employment, news events, personal relationships, hierarchical information, or any combination of these.

In an embodiment, at least two test identities of the system are directly coupled to each other in a social graph. This allows changes in one test identity to show in various features of the system. For example, a "updates to your connections" feature may show for a first test identity when changes are made to the second test identity. Without the connection, the first test identity may not be able to see these changes.

Software Testing

In an embodiment, the system provides software testing. This allows users, developers, Website operators, and other interested parties in a Website a check to see if things will work together. This includes using methods and techniques with the intent of finding software bugs (errors or other defects). In an embodiment, the system provides software testing for XSS vulnerabilities. In alternate embodiments, the system provides software testing for a variety of other purposes, including style, functionality, performance, system, and other testing. For example, the system may be used with functional testing. Functional testing does not necessarily mean that an entire Website needs to be up and running before the testing can be performed. For example, a first feature and a second feature of the system performs a first function on a Website. They may be put together for functional testing to make sure they perform the first function properly.

In an embodiment, the system includes automated Website (or feature) testing. The system allows software features to be tested as web-based applications to be run in an Internet browser. Especially when used together with Agile methodology, test automation allows the system to adjust tests to different conditions or changes made to the code of a specific feature. This allows the system to have a high level of repeatability for the tests and increase the speed at which the tests may be executed. The tests may include a web browsing scenario, including one or more operations to do when at a Web page such as a perform type, click, drag-and-drop operation, and other behaviors an actual user may do at the Web page.

Types of XSS Attacks

In an embodiment, the system is used to detect XSS vulnerabilities, such as stored XSS vulnerabilities. XSS vulnerabilities can generally be categorized into two categories: stored and reflected. For stored XSS attacks, injected malicious script is permanently stored on a Website's servers, such as in a database, user profile information, in a message forum, header, visitor log, comments field, organization information, or other. Later, another user retrieves the malicious script from the server when it requests the stored information. For reflected XSS attacks, injected malicious script is "reflected" off a server. This means that a user supplies the malicious script to the server, which is then sent back to the user. This causes the server to respond to the malicious script, such as producing an error message, search result, or any other response. This may mean that a reflected attack needs to be delivered to users in more than one step, such as in an e-mail message or from another Website to be successful. In alternate embodiments, the system detects both stored and reflected XSS vulnerabilities.

Navigation to Errors

The system may use a variety methods to reach different Web pages where an error occurred (field, position, Web page, feature, or other). An example of different methods that may be used by the system include a reuse method and a backtrace method. While the backtrace method may be more exhaustive, it is time consuming. The reuse method may be faster, but may operate in a more ad hoc manner.

In an embodiment, the system uses a reuse method to navigate to an error. The reuse approach uses a small subset of test identities over and over again without creating new test identities. It allows insertion of as many XSS scripts as desired, then reuses the small subset of test identities over and over again in subsequent tests. This allows injecting on original data, stored for one or more test identities. By running many test cases, the system will detect injected XSS vectors in some pages during subsequent runs of tests. An example use case of the reuse method follows:

(1) Create two test identities and connect them.
(2) Run some tests.
(3) During a first test, a first test identity edits their profile by injecting XSS vectors into their profile.
(4) During a second test, a second test identity sends an electronic message but nothing interesting is found during testing.
(5) During a third test, a second test identity views the profile of the first test identity and discovers an XSS error.

This method may not guarantee an error to be immediately discovered. For example, during the second test in the use case above, which may have tested for other errors, but not the one injected during the first test. However, using the iterative approach, the system will discover most, if not all, errors. For example, during the third test in the use case above, the error was detected.

In an embodiment, the system uses a backtracing method to navigate to an error. The backtracing method injects XSS vectors into all input fields. An example process of a backtracing method follows:

(1) Collect information about page flow and input fields by scanning relevant Web pages of the Website to test without injecting XSS vectors. Examples of XSS vectors include the positions, locations, or fields detected by the system, where input may be received. However, not all positions, locations, or fields detected by the system need to be vulnerable to an XSS attack.
(2) Scan for input fields in the Web pages.
(3) Inject errors (e.g., XSS error, example error, or other) or other test code in each injection point or input field.
(4) If the system fails to reach the end of the test case, then reduce an injection point. This can be at random or other method.
(5) Repeat step 4, until there are no remaining injection points or the test case reaches its end.

Using the backtracing method, if the system reaches the end of the test case before running out of injection points to remove, then the system will report that the last removed injection point is a cause of a XSS error.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
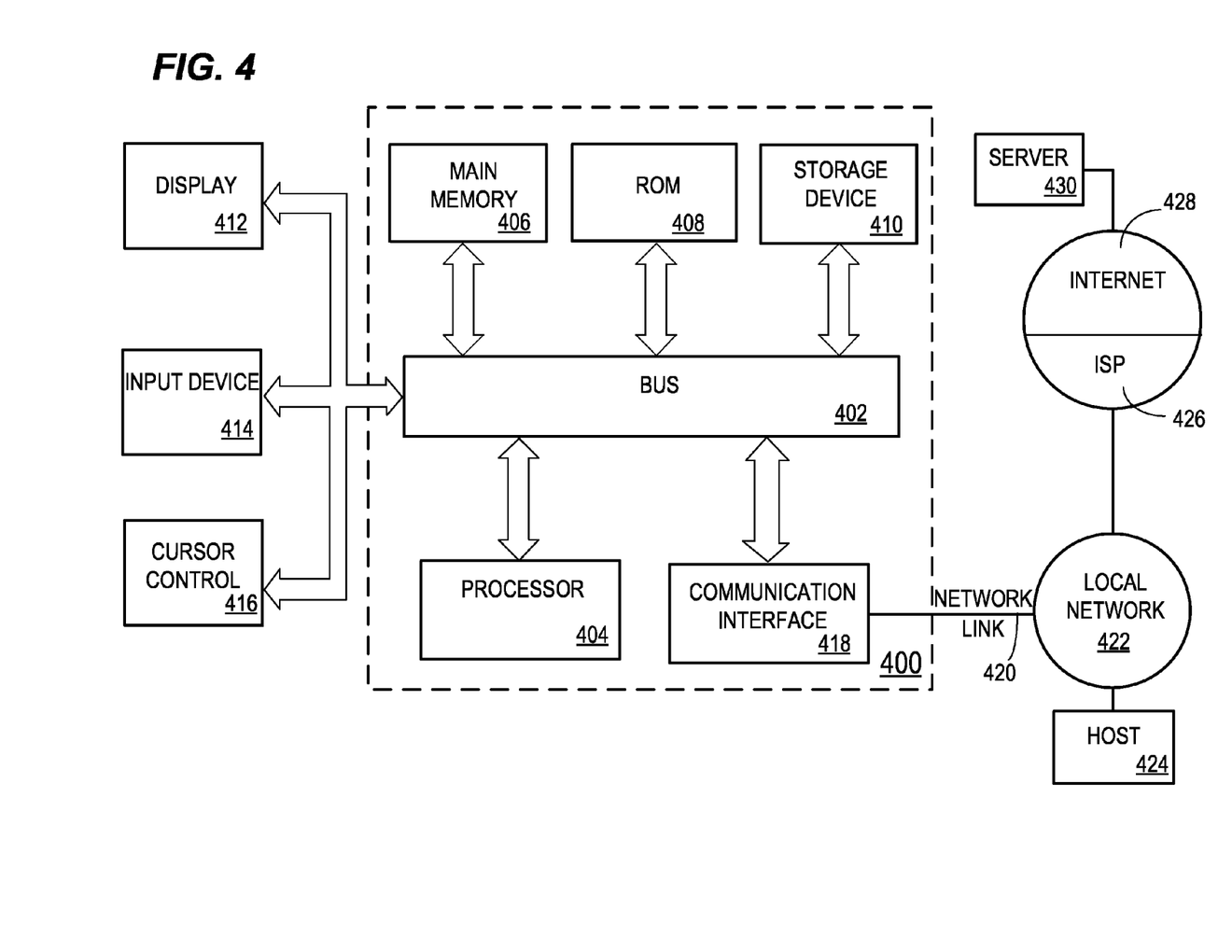
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    creating a plurality of test identities that includes a first test identity and a second test identity that is different than the first test identity, wherein the plurality of test identities are used for testing purposes and do not represent actual users of an online system that comprises a first feature and a second feature that is different than the first feature;
    maintaining a testing database comprising a first set of tests associated with the first feature and a second set of tests associated with the second feature;
    modifying a first attribute associated with the first test identity to create a modified first attribute;
    after modifying the first attribute, executing the first set of tests associated with the first feature;
    returning a pass condition when executing, based on the modified first attribute associated with the first test identity and a selected first test identity of the plurality of test identities, the first set of tests associated with the first feature;
    wherein the first set of tests comprises accessing the first feature using the selected first test identity;
    after modifying the first attribute, executing the second set of tests associated with the second feature; and
    returning a fail condition when executing, based on the modified first attribute and a selected second test identity of the plurality of test identities that is different than the selected first test identity, the second set of tests associated with the second feature;
    wherein the second set of tests comprises accessing the second feature using the selected second test identity.

2. The method of claim 1 further comprising, when the fail condition is returned, allowing the online system to identify the first modified attribute as a cause of the fail condition.

3. The method of claim 1 wherein the fail condition comprises a successful cross-site scripting (XSS) injection.

4. The method of claim 1 wherein returning the fail condition comprises detecting, on a first Web page including the second feature, a successful injection of code.

5. The method of claim 1 wherein executing the second set of tests occurs after modifying the first attribute associated with the first test identity and before modifying a second attribute associated with the plurality of test identities.

6. The method of claim 1 wherein the executing the second set of tests comprises executing the second set of tests in response to modification of the first attribute.

7. The method of claim 1 further comprising, before the modifying the first attribute, modifying a second attribute associated with the first test identity or the second test identity to create a modified second attribute, wherein executing the first and second sets of tests associated with the first and second features, respectively, includes executing the first and second sets of tests based on the first and second modified attributes.

8. The method of claim 1 further comprising:
    before modifying the first attribute, scanning a Website to identify first and second vectors, wherein the first and second vectors comprise a location in the Website where information is received.

9. The method of claim 8 further comprising choosing to inject in the first vector a first sample of test code.

10. The method of claim 9 further comprising choosing not to inject in the second vector.

11. The method of claim 9 further comprising choosing to inject in the second vector a second sample of test code.

12. The method of claim 1 wherein first and second test identities include privileges to access the first and second features.

13. The method of claim 1 wherein the first feature comprises a profile feature of the online system.

14. The method of claim 1 wherein the first feature comprises a news feature of the online system.

15. The method of claim 1 further comprising:
    limiting the users of the online system from accessing information associated with the first and second test identities.

16. The method of claim 1 further comprising:
    preventing the users of the online system from accessing the modified first attribute.

17. A method comprising:
    creating a plurality of test identities that includes a first test identity and a second test identity that is different than the first test identity, wherein the first and second test identities are directly coupled by a first edge in a social graph;
    modifying a first attribute associated with the first test identity to create a modified first attribute;
    after modifying the first attribute, executing a first set of tests associated with a first feature;
    returning a pass condition when executing, based on the modified first attribute associated with the first test identity and a selected first test identity of the plurality of test identities, the first set of tests associated with the first feature;
    wherein the first set of tests comprises accessing the first feature using the selected first test identity;
    after modifying the first attribute, executing a second set of tests associated with a second feature that is different than the first feature; and
    returning a fail condition when executing, based on the modified first attribute and a selected second test identity of the first edge that directly couples the first and second test identities, the second set of tests associated with the second feature;
    wherein the second set of tests comprises accessing the second feature using the selected second test identity.

18. The method of claim 17 wherein the fail condition occurs when viewing the first attribute associated with the first test identity by the second test identity.

19. A system comprising:
one or more processors;
one or more computer-readable media carrying instructions which, when executed by the one or more processors, cause:
creating a plurality of test identities that includes a first test identity and a second test identity that is different than the first test identity, wherein the plurality of test identities are used for testing purposes and do not represent actual users of an online system that comprises a first feature and a second feature that is different than the first feature;
maintaining a testing database comprising a first set of tests associated with the first feature and a second set of tests associated with the second feature;
modifying a first attribute associated with the first test identity to create a modified first attribute;
after modifying the first attribute, executing the first set of tests associated with the first feature;
returning a pass condition when executing, based on the modified first attribute associated with the first test identity and a selected first test identity of the plurality of test identities, the first set of tests associated with the first feature;
wherein the first set of tests comprises accessing the first feature using the selected first test identity;
after modifying the first attribute, executing the second set of tests associated with the second feature; and
returning a fail condition when executing, based on the modified first attribute and a selected second test identity of the plurality of test identities that is different than the selected first test identity, the second set of tests associated with the second feature,
wherein the second set of tests comprises accessing the second feature using the selected second test identity.

20. The system of claim 19 wherein the one or more computer-readable media carrying instructions which, when executed by the one or more processors, further cause:
when the fail condition is returned, allowing the system to identify the first modified attribute as a cause of the fail condition.

* * * * *